United States Patent
Bhimani et al.

(10) Patent No.: US 11,584,342 B2
(45) Date of Patent: Feb. 21, 2023

(54) REAL-TIME PERFORMANCE HANDLING VIRTUAL TIRE SENSOR

(71) Applicants: VOLKSWAGEN AG, Wolfsburg (DE); AUDI AG, Ingolstadt (DE); PORSCHE AG, Stuttgart (DE)

(72) Inventors: Mohak Bhimani, Menlo Park, CA (US); Sai Prasad Nooka, Foster City, CA (US); Nikhil George, Palo Alto, CA (US)

(73) Assignees: Volkswagen AG; Audi AG; Porsche AG

( * ) Notice: Subject to any disclaimer, the term of this patent is extended or adjusted under 35 U.S.C. 154(b) by 756 days.

(21) Appl. No.: 16/665,741

(22) Filed: Oct. 28, 2019

(65) Prior Publication Data

US 2021/0122340 A1 Apr. 29, 2021

(51) Int. Cl.
| | |
|---|---|
| *H04L 67/12* | (2022.01) |
| *B60T 8/172* | (2006.01) |
| *G06N 3/08* | (2023.01) |
| *B60W 40/12* | (2012.01) |
| *B60W 30/18* | (2012.01) |

(Continued)

(52) U.S. Cl.
CPC .......... *B60T 8/1725* (2013.01); *B60W 30/045* (2013.01); *B60W 30/18145* (2013.01); *B60W 40/12* (2013.01); *G06N 3/08* (2013.01); *H04L 67/12* (2013.01); *B60C 2019/004* (2013.01);
(Continued)

(58) Field of Classification Search
CPC .......... B60T 8/1725; B60T 7/12; B60T 8/171; B60T 2201/03; B60T 2210/30; B60T 2240/02; B60T 2240/03; B60W 30/045; B60W 30/18145; B60W 40/12; B60W 30/146; B60W 30/162; B60W 2530/20; B60W 2555/00; B60W 2552/00; B60W 2554/00; B60W 2556/45; G06N 3/08; G06N 7/005; H04L 67/12; H04L 2012/40215; H04L 2012/40273; B60C 2019/004; B60C 19/00; B60C 11/246; B60C 23/062; B60C 99/006; G01M 17/022; G01M 17/00; G01M 17/007;
(Continued)

(56) References Cited

U.S. PATENT DOCUMENTS

| | | | |
|---|---|---|---|
| 8,599,005 B2 | 12/2013 | Fargas et al. | |
| 10,053,088 B1 * | 8/2018 | Askeland | B60W 40/109 |

(Continued)

FOREIGN PATENT DOCUMENTS

| | | |
|---|---|---|
| CN | 108107731 A | 6/2018 |
| EP | 3023761 A2 | 5/2016 |

(Continued)

OTHER PUBLICATIONS

Search Report and Written Opinion for International Patent Application No. PCT/EP2020/080120; dated Dec. 15, 2020.

*Primary Examiner* — Hai Phan
*Assistant Examiner* — Anthony D Afrifa-Kyei
(74) *Attorney, Agent, or Firm* — Barnes & Thornburg, LLP

(57) ABSTRACT

Devices, systems, and methods related to prediction of tire performance using existing CAN data to improve overall vehicle performance. Machine learning tools are applied to CAN data, for example pilot data and/or vehicle dynamics data, to predict tire performance factors for use in a vehicle control system to provide vehicle lateral guidance control.

19 Claims, 4 Drawing Sheets

(51) Int. Cl.
    *B60W 30/045*     (2012.01)
    *B60C 19/00*     (2006.01)
    *H04L 12/40*     (2006.01)

(52) U.S. Cl.
    CPC ............... *H04L 2012/40215* (2013.01); *H04L 2012/40273* (2013.01)

(58) Field of Classification Search
    CPC ..... G01M 17/02; G01M 17/024; G06F 30/15; G06F 30/20; G06Q 10/20; G08G 1/22; H04W 4/44
    See application file for complete search history.

(56)     References Cited

U.S. PATENT DOCUMENTS

| | | | |
|---|---|---|---|
| 10,078,892 B1 | 9/2018 | Wang et al. | |
| 10,471,953 B1* | 11/2019 | Askeland | B60W 50/085 |
| 2020/0086880 A1* | 3/2020 | Poeppel | G06F 9/542 |
| 2020/0089243 A1* | 3/2020 | Poeppel | B60W 60/00182 |
| 2021/0188252 A1* | 6/2021 | Lu | B60W 40/12 |
| 2021/0213935 A1* | 7/2021 | Lu | B60W 10/18 |

FOREIGN PATENT DOCUMENTS

| | | | |
|---|---|---|---|
| EP | 3017971 B1 | 9/2018 | |
| FR | 2902909 A1 | 12/2007 | |
| WO | 0192078 A2 | 12/2001 | |

\* cited by examiner

REAL-TIME PERFORMANCE HANDLING VIRTUAL TIRE SENSOR

FIELD

The present disclosure relates to systems, components, and methodologies for vehicles. More particularly, the present disclosure relates to systems, components, and methodologies for enhancing operation of vehicles by modeling of tire performance.

BACKGROUND

Tire performance can be an important aspect of overall vehicle performance. The ability of the vehicle to corner to its greatest performance standards can be highly dependent on tire performance. However, tire performance can vary considerably based on intrinsic and/or extrinsic factors. For example, the amount and/or type of wear on a particular tire can have significant intrinsic impacts on the tire performance. Moreover, extrinsic factors such as temperature, humidity, and/or loading of the vehicle can incur different tire response. However, conventional tire monitoring systems may apply predetermined assumptions for tire performance that may overlook real world and/or real-time information.

SUMMARY

Disclosed embodiments provide a method of operating a transportation vehicle for performance lateral guidance control, which may include receiving Controller Area Network (CAN) data from a CAN system of the vehicle that may include vehicle dynamics data including in-plane acceleration data and pilot data including thrust data.

Disclosed embodiments may determine a real-time tire performance factor for at least one tire of the vehicle based on the CAN data received from the CAN system, wherein the real-time tire performance factor indicates a degree of performance of the at least one tire for cornering based on the vehicle dynamics and pilot data.

Disclosed embodiments may adjust a lateral guidance performance profile of the vehicle, in a control system of the vehicle, based on the real-time tire performance factor for the at least one tire to govern lateral steering of the vehicle according to the real-time tire performance factor.

In disclosed embodiments, the determination of the real-time lateral performance factor may indicate a real-time prediction of cornering load limitations of the at least one tire based on the vehicle dynamics and pilot data for determining cornering capacity of the vehicle. The real-time prediction of cornering load limitations of the at least one tire may include a prediction of cornering performance of the at least one tire based on tire deterioration. Tire deterioration of the prediction of cornering performance of the at least one tire may be determined based on the vehicle dynamics and pilot data.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which.

DETAILED DESCRIPTION OF THE DISCLOSED EMBODIMENTS

Tire performance can present an important factor to overall vehicle performance, whether focused on high performance aspects such as speedy cornering, or safety aspects such as avoiding loss of traction. However, traditional systems can fail to consider more precise conditions affecting the tires. For example, traditional approaches can assume artificial and/or predetermined tire performance limits. By overlooking available information regarding tire performance, the full potential of the tire may be underutilized, along with the full potential of the vehicle.

The importance of tire performance to overall vehicle performance can be related to the preferred utilization of torque from the powertrain. Tire behavior can directly affect the optimal balance of traction and drive from the motor of the transportation vehicle. However, the complexities of tire behavior can present significant challenges to real-time predictions of tire performance. Furthermore, these issues can be additionally complicated in consideration of vehicle dynamics in real-time. For example, when cornering, a vehicle's weight can shift dramatically causing differences in the forces experienced at each tire. Indeed, the dynamic position of the vehicle's weight even before entering a new phase of cornering can drastically change the tire performance analysis.

Thus, the tire behavior, as a condition of the tire's real-time operational state, in combination with conditions of real-time vehicle dynamics can present an opportunity for significantly improved prediction of tire performance. Dynamically modeling the tire performance in real-time to inform the vehicle control system can provide up-to-the-moment predictions to allow exploitation of the full potential of the tire and/or the vehicle in vehicle handling operations such as cornering.

Figure 1:
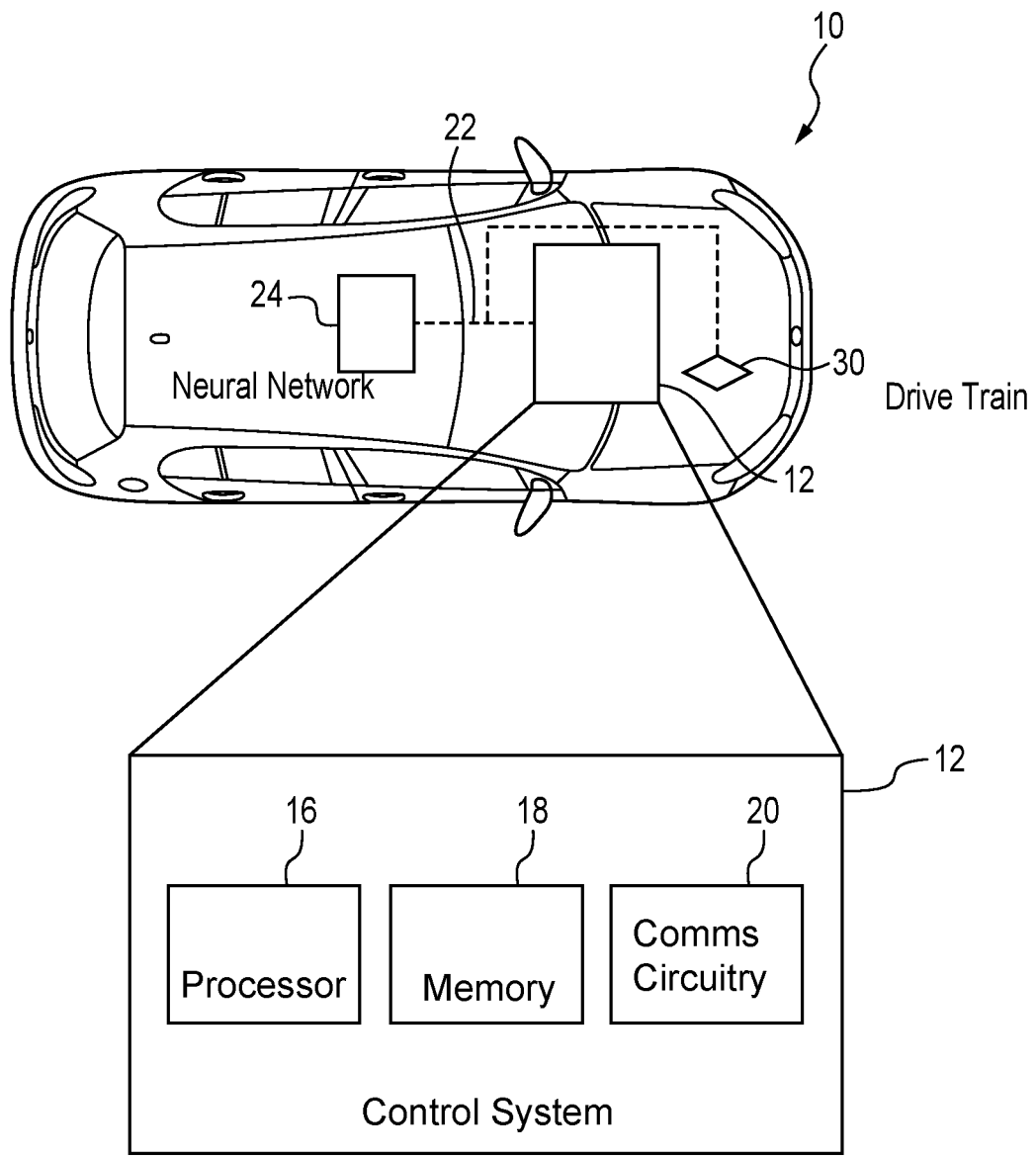
FIG. 1 is an overhead plan view of a transportation vehicle for performance guidance control showing that the vehicle includes a CAN system for communicating vehicle data, a control system provides guidance control, and a neural network adapted to determine real-time tire performance factors for adjustment of guidance performance profiles of the control system.

Referring now to FIG. 1, a vehicle 10 is shown in accordance with illustrative embodiments of the present disclosure. The vehicle 10 can include a vehicle control system 12 for guiding operation of the vehicle 10. The control system 12 is illustratively embodied as a centralized, computer implemented controller providing governance for primary vehicle operations for human driver piloting. In some embodiments, the control system 12 may provide autonomous vehicle operations, whether partial or fully autonomous operations.

The control system 12 (shown in zoom in FIG. 1) can include a processor 16 for executing instructions stored on memory 18, and communication circuitry 20 for sending and receiving communication signals and dictated by the processor 16. The control system 12 can be arranged in communication with vehicle systems via a CAN system 22, embodied as a communication bus system. The CAN system 22 can include communication connection with vehicle systems such as the vehicle's drive train, steering, and/or other systems to provide centralized control and/or information via the control system 12.

The vehicle 10 can include a neural network 24 for modeling tire behavior. The neural network is illustratively embodied as a Convolutional Neural Network (CNN), but in some embodiments may include any suitable form of machine learning module such as Recurrent Neural Network (RNN), support vector machines, and XgBoost. The neural network 24 is arranged in communication with the CAN system 22 to receive CAN data.

The CAN system 22 can obtain information from vehicle systems for use as CAN data. The CAN data can include any available information regarding the vehicle, including but not limited to real-time vehicle dynamics information and/or pilot data. In the illustrative embodiment, vehicle dynamics data can include information regarding the in-plane acceleration of the vehicle, but in some embodiments, may include information regarding vehicle position (yaw, pitch, roll), speed, and/or sideslip. Pilot data can include information regarding the driver inputs such as thrust (gas pedal), steering angle, brake pedal, and/or gear selection, although in some embodiments, pilot data may include tire information collected by dedicated tire sensors, for example, during training and/or development of the neural network 24 which may not be available on the vehicle during actual use.

Figure 2:
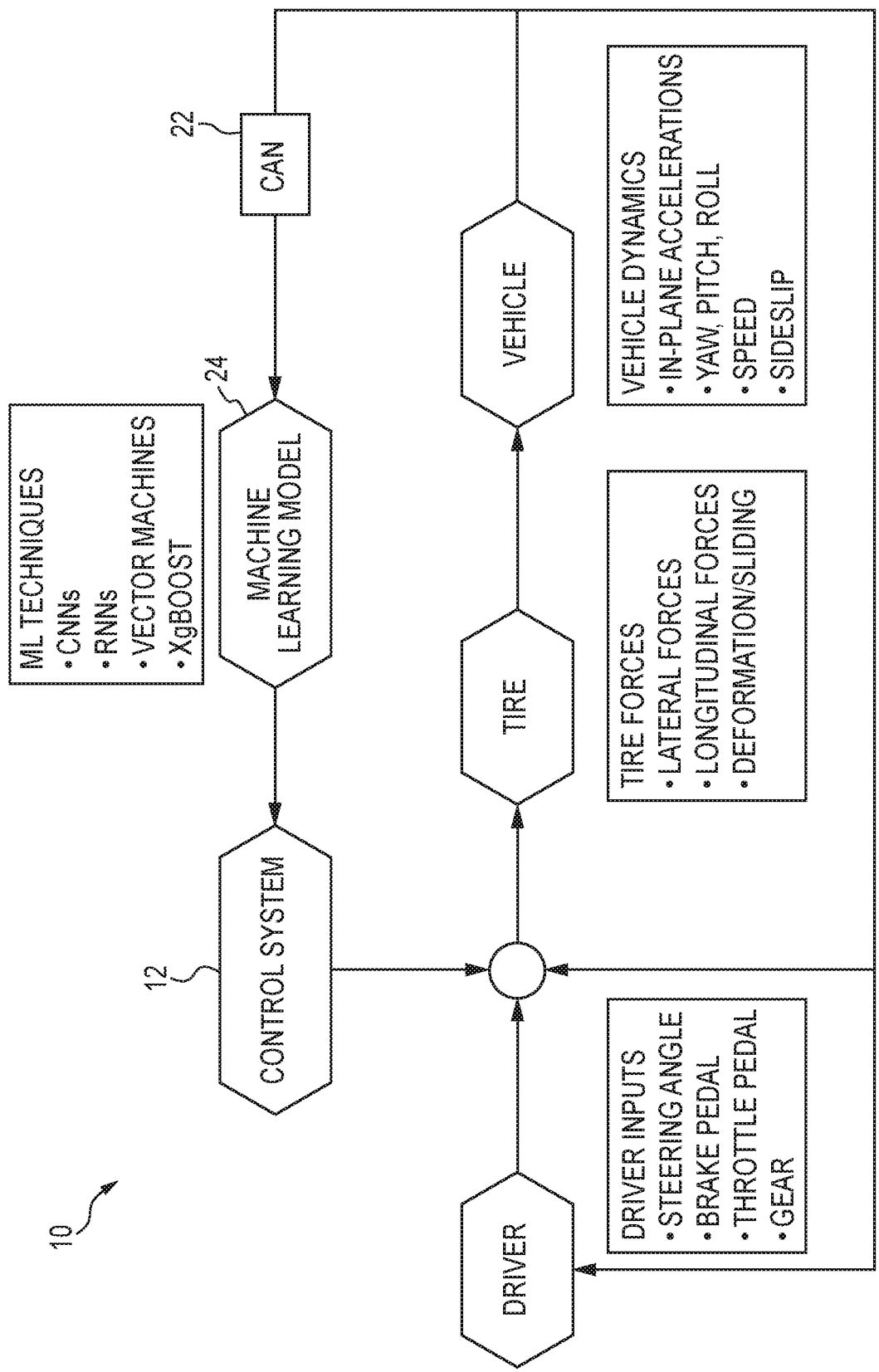
FIG. 2 is a diagrammatic view of interfacing between the control system and neural network of FIG. 1 to enhance performance of vehicle guidance control.

Referring to FIG. 2, the CAN system 22 can generate CAN data for communication with the neural network 24. The CAN system 22 can receive the pilot data and/or vehicle dynamics data from vehicles systems. For example, the drive train (shown as 30 in FIG. 1) may provide communication of an indication of gear selection, speed, and/or positional factors to the CAN system 22. Steering data may be communicated with the CAN system 22 directly, for example, as a direct output from steering mechanisms.

The neural network 24 can receive CAN data from the CAN system 22 to perform machine learning and/or to model tire performance. By consideration of the vehicle dynamics data and pilot data, the neural network 24 can model tire performance, without the need for direct tire sensors in order to accurately predict the tire's performance capability. Thus, the neural network 24 can establish a virtual sensor of the tire performance for real-time decision making.

The neural network 24 can model tire performance based on the CAN data received to provide a predictive model indicating a tire performance factor. As discussed in additional detail below regarding FIG. 4, the tire performance factor can include the operative limits for performance operations from which a vehicle guidance profile can be determined. For example, having the neural network 24 trained to predict tire wear and/or performance factors, the neural network 24 can model the tires in real-time according to the CAN data to provide an tire performance factor for utilization in present vehicle operations. The neural network 24 can provide the tire performance factor to the control system 12 for determining vehicle operations.

The neural network 24 can update the tire performance factor based on real-time information from the CAN system 22. The neural network 24 can receive updated CAN data in real-time and may provide an updated tire performance factor for utilization in present vehicle operations. The neural network 24 can provide the updated tire performance factor to the to control system 12 for determining vehicle operations.

The control system 12 can determine a guidance performance profile of the vehicle based on the (latest predicted) tire performance factor. The control system 12 can adjust an existing performance profile of the vehicle based on the tire performance factor. For example, if the neural network 24 has previously predicted reduced tire performance for one or more tires, e.g., according to wear and/or conditions of the tire, predicted on the basis of real-time pilot and/or vehicle dynamics data received from the CAN system 22, the control system 12 can apply the tire performance factor to determine a performance profile having reduced loading to the one or more tires accordingly. In the illustrative embodiment, the neural network 24 may model each tire of the vehicle independently to determine individual tire performance factors for each tire, but in some embodiments, more than one tire may be modeled collectively and formed as a collective tire performance factor.

The control system 12 can apply the vehicle performance profile in the form of a tire performance threshold based on the real-time conditions of the vehicle. For example, the control system 12 may apply a tire performance threshold as a lateral loading threshold for an individual tire. By further example, the practical performance threshold applied when cornering the vehicle may depend on the thrust applied when entering the turn to reduce or increase the recommended angle of cornering, degree of thrust, and/or speed in various sections of the turn.

Figure 3:
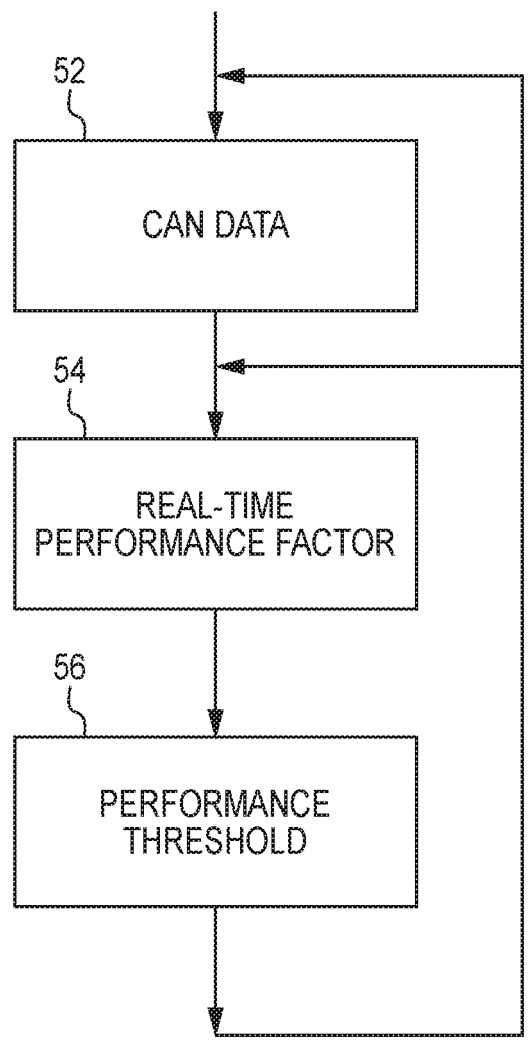
FIG. 3 is a flow diagram showing that CAN data is received for determining a real-time performance factor of one or more tires of the vehicle, and showing that a performance profile can be set based on the real-time performance factor.

FIG. 3 is a flow diagram showing that CAN data is received for determining a real-time performance factor of one or more tires of the vehicle, and showing that a performance profile can be set based on the real-time performance factor. As shown in FIG. 3, the CAN data can be gathered at 52 by the CAN system and provided to the neural network and/or the control system. The neural network can determine the tire performance factor at 54 for real-time conditions. The neural network can communicate the tire performance factor to the control system. The control system can determine the vehicle performance profile at 56. The control system can apply the vehicle performance profile as a threshold.

In the illustrative embodied, the tire performance factor may be a tire lateral performance factor concerning the extent of cornering performance of the tire. Based on the historical CAN data, the neural network 24 can model the tire performance and can determine the tire lateral performance factor in real-time. The tire lateral performance factor can characterize the tires real-time ability to handle lateral loading imposed from cornering the vehicle.

By way of non-limiting practical example, the tire's ability to handle lateral loads from vehicle cornering may be significantly reduced based on the amount and/or characteristic of tire wear. The neural network 24 can predict the nature of tire wear based on the past and/or present CAN data received. For example, the neural network 24 can predict the amount, repetition, and/or nature of side wall deformation which the tire has undergone based on the CAN data, to accurately and/or precisely predict the real-time performance of the tire. The prediction of real-time performance of the tire can be communicated to the control system 12 as a tire lateral performance factor.

The control system 12 can determine the lateral performance profile of the vehicle based on the tire lateral performance factor. Continuing from our side wall deformation example, from the tire lateral performance factor the control system 12 may determine that side wall fatigue is more or less concerning for given real-time conditions, and may determine that steeper cornering angle is preferred with lower speeds, or that higher speeds are preferable to steeper cornering angle under given real-time considerations.

Of course the particular vehicle operations provided by control system 12 may include any variety of suitable factors and/or goals. For example, in high-performance scenarios such as race conditions, the control system 12 may apply the tire lateral performance factor to raise the speeds in cornering to the tires' full potential, while in public roadway scenario, increasing the operational safety margin and/or fuel economy may be preferred. Regardless, by modeling and applying the tire lateral performance factor in real-time, the vehicle performance can be improved.

Figure 4:
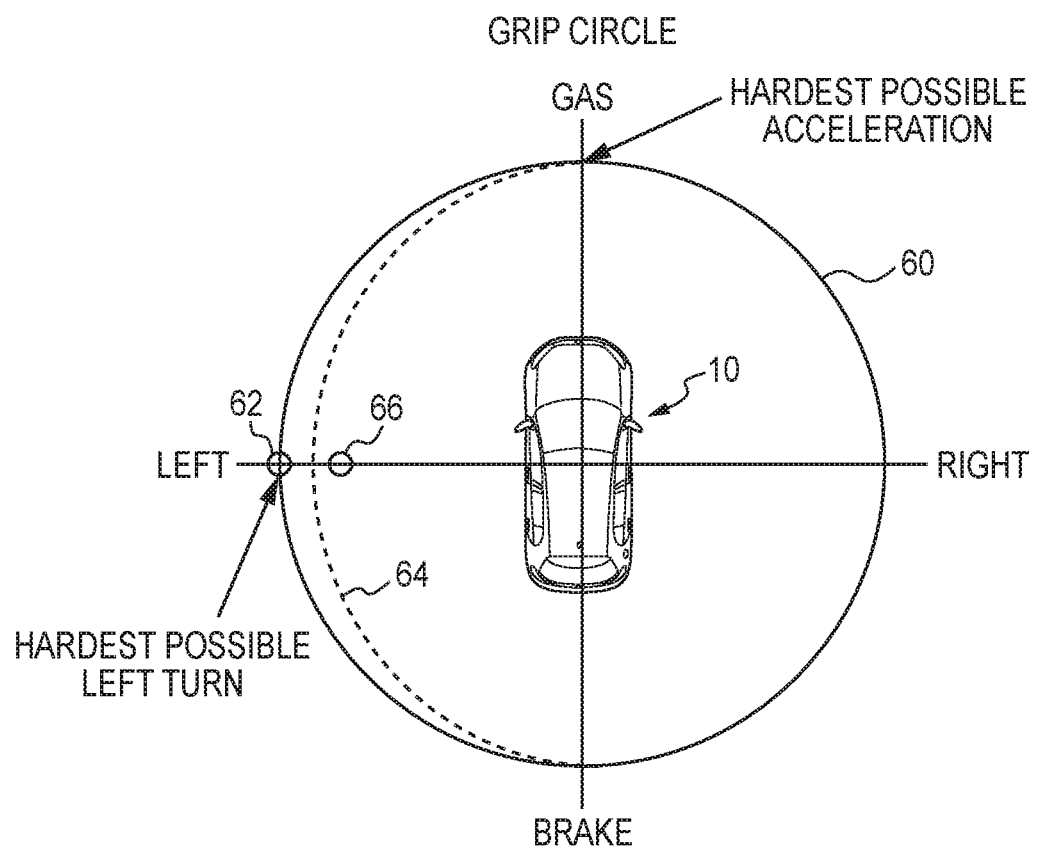
FIG. 4 is a screen of a user display of the vehicle of FIG. 1 showing a depiction of an adjusted guidance performance profile of the vehicle.

Referring to FIG. 4, a depiction is shown which may in some embodiments may be output on a user interface screen to communicate with a driver. Continuing from our racing example, the vehicle 10 is represented in the center. The control system 12 has in real-time determined the lateral vehicle performance profile represented as grip circle 60. A grip extent indicator 62 may be displayed relative to the grip circle 60 to communicate to the driver how much of the lateral grip performance the vehicle 10 is using as it corners.

As the neural network 24 models tire lateral performance, providing updated tire lateral performance factors to the control system 12, the control system 12 may determine the updated vehicle lateral performance profile 64 with updated grip extent indicator 66. Notably, the left-hand portion of the updated vehicle lateral performance profile 64 is slightly reduced when compared with the earlier profile 62, as indicated by closer proximity to the vehicle, representing that a lesser grip profile is available. The less grip profile may be present, for example, due to lower tire performance and/or more aggressive cornering in the present moment.

Similarly, the updated grip extent indicator 66 is closer to the vehicle than the earlier indicator 62. The driver can actively view the user interface to receive visual indication of the vehicle lateral performance profile, and the grip extent indicator. The driver can use the visual indication to use the full available lateral performance of the vehicle based on the tire lateral performance factor, updated in real-time.

In some embodiments, the vehicle lateral performance profile may be implemented in an autonomous vehicle control operation of the control system 12. The autonomous vehicle control operation may include fully or partly autonomous operation of the vehicle. For example, the control system 12 in a fully autonomous mode can execute the autonomous vehicle control operation to navigate a turn based on the vehicle lateral performance profile, without driver intervention. In such embodiments, the control system 12 may communicate instructions to the vehicle systems based on the vehicle lateral performance profile.

Accordingly, devices, systems, and methods within the present disclosure can provide improved use of available tire lateral performance to improve vehicle cornering. Within the present disclosure, vehicle performance can be improved by tire model predictions in real-time. The tires can be among the most important components when it comes to vehicle dynamics and performance. Friction/traction can be key, for example in cornering, to best utilize the torque which powertrain generates.

Tire behavior can be influenced by many parameters and factors. Thus, it can become difficult to model the effects and/or changes to tire performance in real-time. Information about the tire, for example, tire construction and/or dimensions, can be key for vehicle systems like traction control and/or torque vectoring for which traditional systems have often employed overly conservative and/or fixed estimates of tire performance. Having better understanding of actual tire in real-time can help in mapping the effects, for example effects of ageing. A pre-trained machine learning model can predict tire behavior and/or performance in real-time, which will, in turn, result in improving overall vehicle performance.

Traditional systems do not model or predict tire behavior dynamically in real-time. Instead, using tire data from development phase, traditional systems often apply a conservative limit of tire performance to avoid loss of traction while driving the vehicle. These artificial limits can ensure that vehicle is always operated within set parameters, but can fail to utilize the full potential of the tire and/or powertrain.

In order to apply these traditional limits, lots of testing and tuning is performed to determine the performance estimates. Arrangements within the present disclosure reduce reliance on manual tuning, and rather use a machine learning model to provide traction performance in real-time. By providing more information about the tire's dynamic behavior to the control system, this dynamic behavior can be modeled using machine learning. Essentially acting as a virtual sensor for the control system. Disclosed implementations can include tire behavior modeling and control system improvement.

In the development phase, using development hardware (e.g., extra sensors) tire and/or vehicle CAN data can be collected across the life span of a specified tire. Relevant CAN signals can include velocity, steering angle, accelerator position, brake pressure, tire pressure, ambient temperature, IMU signals, etc. This data can then be processed and with some physical-based models to obtain an estimate of tire behavior. CAN data and the estimated behavior using development hardware are used to build machine learning (ML) models like Neural Networks (CNN, RNN), support vector machines or XgBoost. Real-time dynamic tire behavior changes can be harnessed with respect to load transfer, age, tire wear, effect of vertical load, and/or vehicle dynamics.

After training the ML model to learn the effects of different changes, the ML model would only need few signals (e.g., from the typical CAN system) to provide predicting of tire performance in real-time. By way of example, one of the outputs from machine learning models can include the predicted amount of force ($F_x$, $F_y$) the tire can handle with the given driving conditions. Another part to this system would include using the predicted information in real-time with vehicle control system. There may be many ways in which the control system can benefit from the tire model information, for example, having a dynamic limit for traction control and launch control systems. Similarly, powertrain and vehicle dynamics systems may use this to help drivers push the vehicle faster around corners.

Disclosed embodiments can improve vehicle performance by solving problems of not knowing dynamic behavior of tire in real-time. Effects of several intrinsic and extrinsic tire characteristics are not captured by conventional vehicle system in real time; rather, existing systems often rely on hard set limits to maintain stability. Having better understanding of the tire can provide performance improvement and can enable the driver to use the full potential of tire.

As previously mentioned, an example of areas for improved tire performance can consider thermal and aging effects on tires. For a driver, the vehicle ride can feel different on the road or track if the tire is hot or at the ambient temperature. These effects can be understood with simple metrics of frictions, $F_x$ and $F_y$. These values can represent the amount of force a tire can handle in X and Y direction, which can be predicted using vehicle CAN signals by machine learning tools. The predicted performance of the tires can be applied to provide improved overall vehicle performance optimization. One such example of implementation of this innovation in real life would be to alert the driver if he/she can push the car further (e.g., acceleration, trajectory angle, etc.) while taking a turn. This could be on a scale of 1 to 10, where each of these numbers represents a vehicle's ability to handle force, e.g., acceleration. Another example could be using this tire model information to implement a launch control system, wherein the dynamic tire behavior may be taken into account by a vehicle control system itself to dynamically push a vehicle's acceleration limit.

In disclosed embodiments, determining the real-time tire performance factor may comprise analyzing real-time CAN data by a neural network trained to model tire behavior of the at least one tire based on historical vehicle dynamics and pilot data. Determining the real-time tire performance factor may comprise analyzing real-time ambient conditions. Pilot data may include at least one of steering angle, brake percentage, and gear selection. Vehicle dynamics data may include at least one of yaw, pitch, roll, speed, and side slip. CAN data may comprise tire forces including at least one of tire lateral forces, tire longitudinal forces, tire deformation, and tire sliding.

Disclosed embodiments may include a system for performance lateral guidance control of a vehicle, which may include a CAN system for communicating vehicle data between in-vehicle systems, wherein vehicle data may include CAN data including vehicle dynamics data including in-plane acceleration data of the vehicle and pilot data including thrust data of the transportation vehicle. A mechanism for modeling tire behavior for enhancing vehicle cornering by real-time prediction of tire performance may be included, wherein the neural network may be arranged to determine a real-time tire performance factor for at least one tire of the vehicle based on CAN data from the CAN system. That real-time tire performance factor may indicate a degree of performance of the at least one tire for cornering based on the vehicle dynamics and pilot data. Additionally, a lateral guidance control system may be provided in communication with the neural network to receive the real-time tire performance factor. The lateral guidance control system may be arranged to dynamically adjust a lateral guidance performance profile of the vehicle based on the real-time tire performance factor for the at least one tire to govern lateral steering of the vehicle according to the real-time tire performance factor.

In disclosed embodiments, the real-time lateral performance factor may indicate a real-time prediction of cornering load limitations of the at least one tire based on the vehicle dynamics and pilot data for determining cornering capacity of the vehicle. The real-time prediction of cornering load limitations of the at least one tire may include a prediction of cornering performance of the at least one tire based on tire deterioration. Tire deterioration of the prediction of cornering performance of the at least one tire may be determined based on the vehicle dynamics and pilot data.

In disclosed embodiments, the neural network may be trained to model tire behavior of the at least one tire based on historical vehicle dynamics and pilot data. The neural network may determine the real-time tire performance factor based on real-time ambient conditions. Pilot data may include at least one of steering angle, brake percentage, and gear selection. Vehicle dynamics data may include at least one of yaw, pitch, roll, speed, and side slip. CAN data may include tire forces including at least one of tire lateral forces, tire longitudinal forces, tire deformation, and tire sliding.

In the context of illustrative embodiments, examples of suitable processors may include one or more microprocessors, integrated circuits, System-on-a-Chips (SoCs), among others. Examples of suitable memory, may include one or more primary storage and/or non-primary storage (e.g., secondary, tertiary, etc. storage); permanent, semi-permanent, and/or temporary storage; and/or memory storage devices including but not limited to hard drives (e.g., magnetic, solid state, etc.), optical discs (e.g., CD-ROM, DVD-ROM), RAM (e.g., DRAM, SRAM, DRDRAM), ROM (e.g., PROM, EPROM, EEPROM, Flash EEPROM), volatile, and/or non-volatile memory, among others.

The discussions herein consider lateral performance aspects, such as tire lateral loading, tire lateral performance factors, lateral performance profiles, and/or other lateral aspects. However, in some embodiments, the performance aspects may include longitudinal performance aspects, such as tire longitudinal loading, tire longitudinal performance factors, longitudinal performance profiles, and/or other longitudinal aspects.

Although certain embodiments have been described and illustrated in exemplary forms with a certain degree of particularity, it is noted that the description and illustrations have been made by way of example only. Numerous changes in the details of construction, combination, and arrangement of parts and operations may be made. Accordingly, such changes are intended to be included within the scope of the disclosure, the protected scope of which is defined by the claims.

What is claimed is:

1. A system for performing lateral guidance control of a transportation vehicle, the system comprising:
   a lateral guidance control system controller;
   means for modeling tire behavior for enhancing transportation vehicle cornering by real-time prediction of tire performance using a neural network arranged to determine a real-time tire performance factor for at least one tire of the vehicle based on Controller Area Network (CAN) data from a CAN system of the transportation vehicle,
   wherein the CAN data includes vehicle dynamics data including in-plane acceleration data of the vehicle and pilot data including thrust data of the transportation vehicle,
   wherein the real-time tire performance factor indicates a degree of performance of the at least one tire for cornering based on the vehicle dynamics and pilot data,
   wherein the lateral guidance control system controller is in communication with the neural network to receive the real-time tire performance factor, and
   wherein the lateral guidance control system controller is arranged to dynamically adjust a lateral guidance performance profile of the vehicle based on the real-time tire performance factor for the at least one tire to govern lateral steering of the vehicle according to the real-time tire performance factor.

2. The system of claim 1, wherein the real-time tire performance factor indicates a real-time prediction of cornering load limitations of the at least one tire based on the vehicle dynamics and pilot data for determining cornering capacity of the vehicle.

3. The system of claim 2, wherein the real-time prediction of cornering load limitations of the at least one tire includes a prediction of cornering performance of the at least one tire based on tire deterioration.

4. The system of claim 2, wherein tire deterioration of the prediction of cornering performance of the at least one tire is determined based on the vehicle dynamics and pilot data.

5. The system of claim 1, wherein the neural network is trained to model tire behavior of the at least one tire based on historical vehicle dynamics and pilot data.

6. The system of claim 1, wherein the neural network determines the real-time tire performance factor based on real-time ambient conditions.

7. The system of claim 1, wherein pilot data includes at least one of steering angle, brake percentage, and gear selection.

8. The system of claim 1, wherein vehicle dynamics data includes at least one of yaw, pitch, roll, speed, and side slip.

9. The system of claim 1, wherein CAN data further includes tire forces including at least one of tire lateral forces, tire longitudinal forces, tire deformation, and tire sliding.

10. A method of performing performance lateral guidance control for a transportation vehicle, the method comprising:
receiving Controller Area Network (CAN) data from a CAN system of the transportation vehicle including vehicle dynamics data including in-plane acceleration data and pilot data including thrust data;
determining a real-time tire performance factor for at least one tire of the transportation vehicle based on the CAN data received from the CAN system, wherein the real-time tire performance factor indicates a degree of performance of the at least one tire for cornering based on the vehicle dynamics and pilot data; and
adjusting a lateral guidance performance profile of the transportation vehicle, in a control system of the vehicle, based on the real-time tire performance factor for the at least one tire to govern lateral steering of the vehicle according to the real-time tire performance factor.

11. The method of claim 10, wherein determining the real-time performance factor indicates a real-time prediction of cornering load limitations of the at least one tire based on the vehicle dynamics and pilot data for determining cornering capacity of the transportation vehicle.

12. The method of claim 11, wherein the real-time prediction of cornering load limitations of the at least one tire includes a prediction of cornering performance of the at least one tire based on tire deterioration.

13. The method of claim 12, wherein tire deterioration of the prediction of cornering performance of the at least one tire is determined based on the vehicle dynamics and pilot data.

14. The method of claim 10, wherein determining the real-time tire performance factor includes analyzing real-time CAN data by a neural network trained to model tire behavior of the at least one tire based on historical vehicle dynamics and pilot data.

15. The method of claim 10, wherein determining the real-time tire performance factor includes analyzing real-time ambient conditions.

16. The method of claim 10, wherein pilot data includes at least one of steering angle, brake percentage, and gear selection.

17. The method of claim 10, wherein vehicle dynamics data includes at least one of yaw, pitch, roll, speed, and side slip.

18. The method of claim 10, wherein the CAN data further includes tire forces including at least one of tire lateral forces, tire longitudinal forces, tire deformation, and tire sliding.

19. A transportation vehicle comprising:
a Controller Area Network (CAN) system; and
a lateral guidance control system coupled to the CAN system and including a controller and software for modeling tire behavior for enhancing transportation vehicle cornering by real-time prediction of tire performance using a neural network arranged to determine a real-time tire performance factor for at least one tire of the vehicle based on CAN data from the CAN system of the transportation vehicle,
wherein the CAN data includes vehicle dynamics data including in-plane acceleration data of the vehicle and pilot data including thrust data of the transportation vehicle,
wherein the real-time tire performance factor indicates a degree of performance of the at least one tire for cornering based on the vehicle dynamics and pilot data,
wherein the lateral guidance control system controller is in communication with the neural network to receive the real-time tire performance factor, and
wherein the lateral guidance control system controller is arranged to dynamically adjust a lateral guidance performance profile of the vehicle based on the real-time tire performance factor for the at least one tire to govern lateral steering of the vehicle according to the real-time tire performance factor.

* * * * *